(12) United States Patent
Kimura et al.

(10) Patent No.: US 8,977,451 B2
(45) Date of Patent: Mar. 10, 2015

(54) VEHICLE, CONTROL APPARATUS AND CONTROL METHOD FOR EQUIPMENT

(75) Inventors: Motonori Kimura, Toyota (JP); Shuhei Ishikawa, Toyota (JP); Shinya Toyoda, Toyota (JP); Akihide Ito, Nagoya (JP); Yasunari Matsui, Okazaki (JP); Sei Kojima, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 6 days.

(21) Appl. No.: 13/634,857

(22) PCT Filed: May 24, 2010

(86) PCT No.: PCT/JP2010/058714
§ 371 (c)(1),
(2), (4) Date: Sep. 13, 2012

(87) PCT Pub. No.: WO2011/148451
PCT Pub. Date: Dec. 1, 2011

(65) Prior Publication Data
US 2013/0013162 A1 Jan. 10, 2013

(51) Int. Cl.
*G06F 7/00* (2006.01)
*G06F 17/00* (2006.01)
*G06F 19/00* (2011.01)
*F16H 61/662* (2006.01)

(52) U.S. Cl.
CPC .............................. *F16H 61/66272* (2013.01)
USPC .............................................. 701/58; 701/51

(58) Field of Classification Search
USPC ......................................... 701/51, 58; 477/45
See application file for complete search history.

(56) References Cited

U.S. PATENT DOCUMENTS

| 2007/0099754 | A1* | 5/2007 | Yamaguchi et al. ............. 477/44 |
| 2007/0298918 | A1* | 12/2007 | Toyoda et al. .................. 474/28 |
| 2008/0004141 | A1 | 1/2008 | Toyoda et al. |
| 2008/0146409 | A1* | 6/2008 | Yamaguchi et al. ............ 477/44 |
| 2009/0082172 | A1* | 3/2009 | Mori et al. ...................... 477/46 |

FOREIGN PATENT DOCUMENTS

| JP | 07217713 A | 8/1995 |
| JP | 11082707 A | 3/1999 |
| JP | 2004-316717 A | 11/2004 |
| JP | 2005-163934 A | 6/2005 |
| JP | 2007-120733 A | 5/2007 |
| JP | 2007-285510 A | 11/2007 |
| JP | 2008-020055 A | 1/2008 |
| JP | 2008-025678 A | 2/2008 |

* cited by examiner

*Primary Examiner* — Fadey Jabr
*Assistant Examiner* — Lail Kleinman
(74) *Attorney, Agent, or Firm* — Gifford, Krass, Sprinkle, Anderson & Citkowski, P.C

(57) ABSTRACT

The first setting value showing holding pressure for a metal belt is set for each of a plurality of control modes A to H. The second setting value changing lagging behind the first setting value is calculated based on the first setting value for each of the plurality of control modes A to H. A target value is set to be equal to or more than the greatest second setting value among a plurality of second setting values. A continuously variable transmission is controlled such that the holding pressure for the metal belt is equal to the set target value.

7 Claims, 13 Drawing Sheets

VEHICLE, CONTROL APPARATUS AND CONTROL METHOD FOR EQUIPMENT

TECHNICAL FIELD

The present invention relates to a vehicle, a control apparatus and a control method for equipment, and particularly to a technique for controlling the equipment based on the value determined for each of a plurality of control modes.

BACKGROUND ART

A continuously variable transmission (CVT) capable of continuously changing the gear ratio is known. In the continuously variable transmission, for example, a metal belt or a chain is held by a primary pulley and a secondary pulley. In the continuously variable transmission, the gear ratio is changed generally by changing the hydraulic pressure supplied to the primary pulley, and more specifically, the hydraulic pressure supplied to a primary sheave of the primary pulley.

For example, as the hydraulic pressure supplied to the primary sheave of the primary pulley is increased, the groove width of the primary pulley is narrowed. Consequently, the effective diameter of the primary pulley is increased. In accordance with an increase in the effective diameter of the primary pulley, the groove width of the secondary pulley is increased while the effective diameter thereof is decreased. Consequently, the continuously variable transmission upshifts.

In contrast, as the hydraulic pressure supplied to the primary sheave of the primary pulley is decreased, the groove width of the primary pulley is increased. Consequently, the effective diameter of the primary pulley is decreased. In accordance with a decrease in the effective diameter of the primary pulley, the groove width of the secondary pulley is narrowed while the effective diameter thereof is increased. Consequently, the continuously variable transmission downshifts.

The pressure for holding a metal belt and the like is adjusted by the hydraulic pressure supplied to the secondary sheave of the secondary pulley, for example, as disclosed in Japanese Patent Laying-Open No. 2005-163934.

Generally, the pressure for holding the metal belt is adjusted in accordance with the driving state of the vehicle so as to prevent the metal belt from slipping. In order to implement the pressure suitable in accordance with each of various driving states, a plurality of control modes are used, in each of which a target value of the hydraulic pressure is set. For example, in one control mode, the greater the input torque of the continuously variable transmission is, the more the pressure for holding the metal belt, that is, the hydraulic pressure supplied to the secondary pulley, is raised.

In another control mode, during deceleration in the state where a brake pedal is depressed, the hydraulic pressure supplied to the secondary pulley is increased as compared with the case where the brake pedal is not depressed. Consequently, the metal belt can be prevented from slipping during braking.

In addition, when the target value of the hydraulic pressure changes, the actual hydraulic pressure may undershoot or overshoot the target value. One approach for preventing such undershoot and overshoot is to gradually change the target value of the hydraulic pressure.

CITATION LIST

Patent Literature

PTL 1: Japanese Patent Laying-Open No. 2005-163934

SUMMARY OF INVENTION

Technical Problem

However, a suitable hydraulic pressure cannot necessarily be achieved only by gradually changing the hydraulic pressure. For example, as shown in FIG. 16, it is assumed that the input torque of the continuously variable transmission is decreased during the time period from time TA at which the brake pedal is depressed to time TB at which the brake pedal is released. In other words, it is assumed that the brake pedal is released immediately after the input torque of the continuously variable transmission is decreased.

In this case, before the brake pedal is depressed, the holding pressure for the metal belt is controlled so as to achieve the pressure determined in consideration of the input torque of the continuously variable transmission. The holding pressure for the metal belt is increased to a pressure determined in consideration of a high braking force while the brake pedal is being depressed. After the brake pedal is released, the holding pressure is gradually lowered to the pressure determined in consideration of the input torque lower than the input torque before the brake pedal is depressed. Accordingly, the amount of decrease in the hydraulic pressure at the time when the brake pedal is released is greater than the amount of increase in the hydraulic pressure at the time when the brake pedal is depressed.

Consequently, also in the region where the hydraulic pressure is decreased due to a decrease in the input torque, the hydraulic pressure is decreased in the manner similar to that in the region where the hydraulic pressure is decreased due to release of the brake pedal. It is, however, not necessarily preferable to decrease the hydraulic pressure in the manner as described above. Therefore, it is desirable to control the continuously variable transmission so as to satisfy the conditions required for each of the plurality of control modes.

An object of the present invention is to control the equipment based on a plurality of conditions determined in a plurality of control modes.

Solution to Problem

A vehicle includes equipment and a control apparatus for controlling the equipment. The control apparatus sets a first value of a parameter representing a state of the equipment for each of a plurality of control modes, calculates a second value that changes lagging behind the first value based on the first value for each of the plurality of control modes, sets a target value of the parameter to be equal to or more than a greatest second value among a plurality of the second values, and controls the equipment such that the parameter is equal to the target value.

Advantageous Effects of Invention

According to the above-described configuration, based on the first value set in each control mode, the second value that changes lagging behind the first value is calculated, for example, as a condition in each control mode at the time when the state of the equipment changes. The target value of the parameter representing the state of the equipment is set to be equal to or more than the greatest second value among the second values set in the plurality of control modes. Consequently, the target value can be set in consideration of the conditions determined for each control mode. The equipment is controlled such that the parameter is equal to the target value. Thus, the equipment can be controlled based on the plurality of conditions determined in the plurality of control modes.

DESCRIPTION OF EMBODIMENTS

Figure 1:
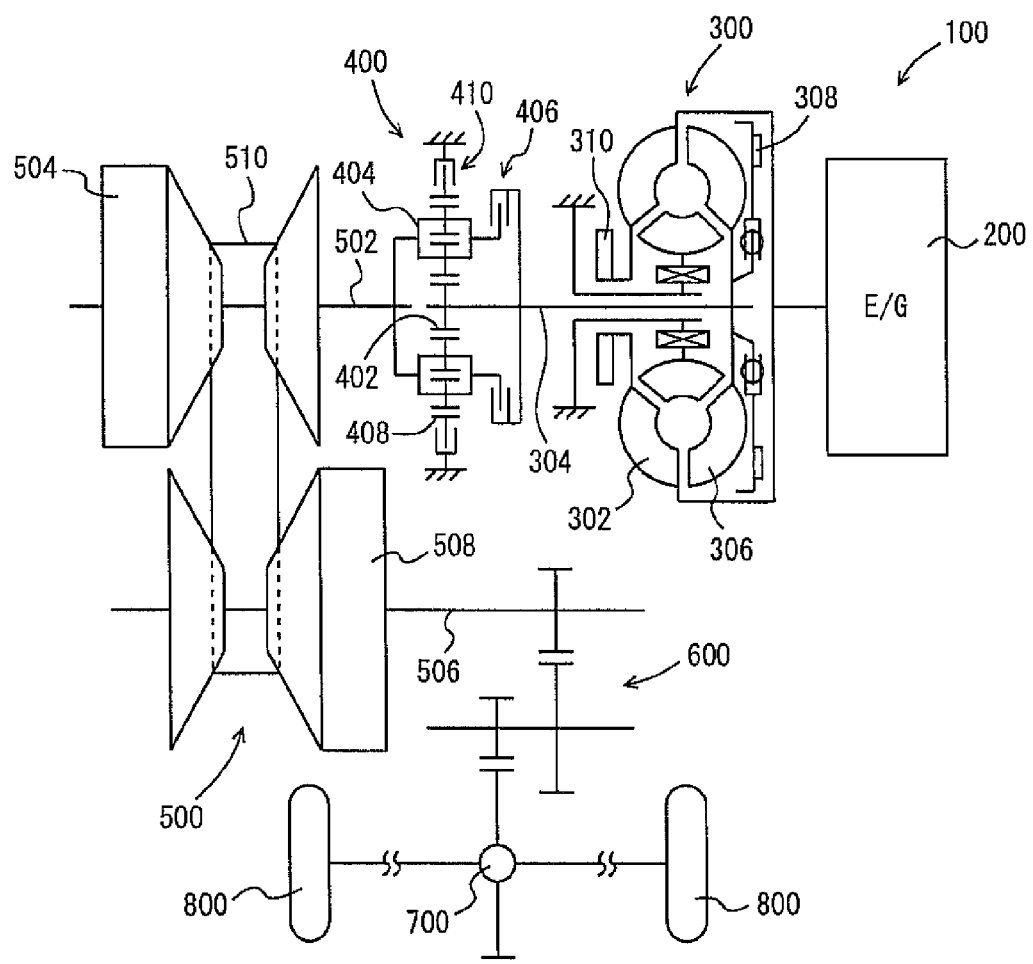
FIG. 1 is a diagram showing a drive device of a vehicle.

The embodiments of the present invention will be hereinafter described with reference to the accompanying drawings. In the following description, the same components are designated by the same reference characters. Names and functions thereof are also the same. Accordingly, detailed description thereof will not be repeated.

First Embodiment

Referring to FIG. 1, the output power of an engine 200 of a powertrain 100 mounted in the vehicle is input into a continuously variable transmission 500 having a forward and backward movement switching device 400 through a torque converter 300. The output power of continuously variable transmission 500 is transmitted to a reduction gear 600 and a differential gear 700, and distributed to a driving wheel 800 on each of the right and left sides. Powertrain 100 is controlled by an ECU (Electronic Control Unit) 900 described below. In place of or in addition to engine 200, a motor may be used as a driving source. A multi-speed automatic transmission may be used in place of continuously variable transmission 500.

Torque converter 300 includes a pump impeller 302 coupled to the crankshaft of engine 200 and a turbine runner 306 coupled to forward and backward movement switching device 400 via a turbine shaft 304. A lock-up clutch 308 is provided between pump impeller 302 and turbine runner 306. Lock-up clutch 308 is engaged or disengaged when the supply of the hydraulic pressure to the oil chamber is switched between the engagement side and the disengagement side.

When lock-up clutch 308 is completely engaged, pump impeller 302 and turbine runner 306 are integrally rotated. Pump impeller 302 is provided with a mechanical oil pump 310 which generates hydraulic pressure used for performing the shift control of continuously variable transmission 500, generating the belt holding pressure by which the belt is pressed laterally from both sides and supplying the ATF (Automatic Transmission Fluid) for lubrication to each unit.

Forward and backward movement switching device 400 includes a double-pinion type planetary gear train. Turbine shaft 304 of torque converter 300 is coupled to a sun gear 402. An input shaft 502 of continuously variable transmission 500 is coupled to a carrier 404. Carrier 404 and sun gear 402 are coupled to each other through a forward clutch 406. A ring gear 408 is fixed to a housing via a reverse brake 410. Forward clutch 406 and reverse brake 410 are frictionally engaged by a hydraulic cylinder. The input revolution speed of forward clutch 406 is equal to the revolution speed of turbine shaft 304, that is, a turbine revolution speed NT.

Forward clutch 406 is engaged and reverse brake 410 is disengaged, to thereby cause forward and backward movement switching device 400 to be brought into the engaged state for forward running. In this state, the driving force in the forward running direction is transmitted to continuously variable transmission 500. Reverse brake 410 is engaged and forward clutch 406 is disengaged, to thereby cause forward and backward movement switching device 400 to be brought into the engaged state for backward running. In this state, input shaft 502 is rotated in the opposite direction with respect to turbine shaft 304. This causes the driving force in the backward running direction to be transmitted to continuously variable transmission 500.

In other words, as forward clutch 406 or reverse brake 410 is engaged, the power output from engine 200 is transmitted to driving wheel 800. When forward clutch 406 and reverse brake 410 are both disengaged, forward and backward movement switching device 400 goes into the neutral state in which power transmission is interrupted.

It is to be noted that forward and backward movement switching device 400 may be disposed between continuously variable transmission 500 and driving wheel 800.

Continuously variable transmission 500 further includes a primary pulley 504 provided in input shaft 502, a secondary pulley 508 provided in an output shaft 506, and a metal belt 510 wound around these pulleys. The friction force between each pulley and metal belt 510 is used for power transmission.

Each pulley is formed of a hydraulic cylinder (sheave) such that its groove has a variable width. The hydraulic pressure of the hydraulic cylinder of primary pulley 504, that is, a primary sheave, is controlled, so that the groove width of each pulley varies. This causes a change in the effective diameter of each pulley, thus allowing a continuous change in a gear ratio GR (=a primary pulley revolution speed NIN/a secondary pulley revolution speed NOUT). It is to be noted that a chain may be used in place of metal belt 510.

Figure 2:
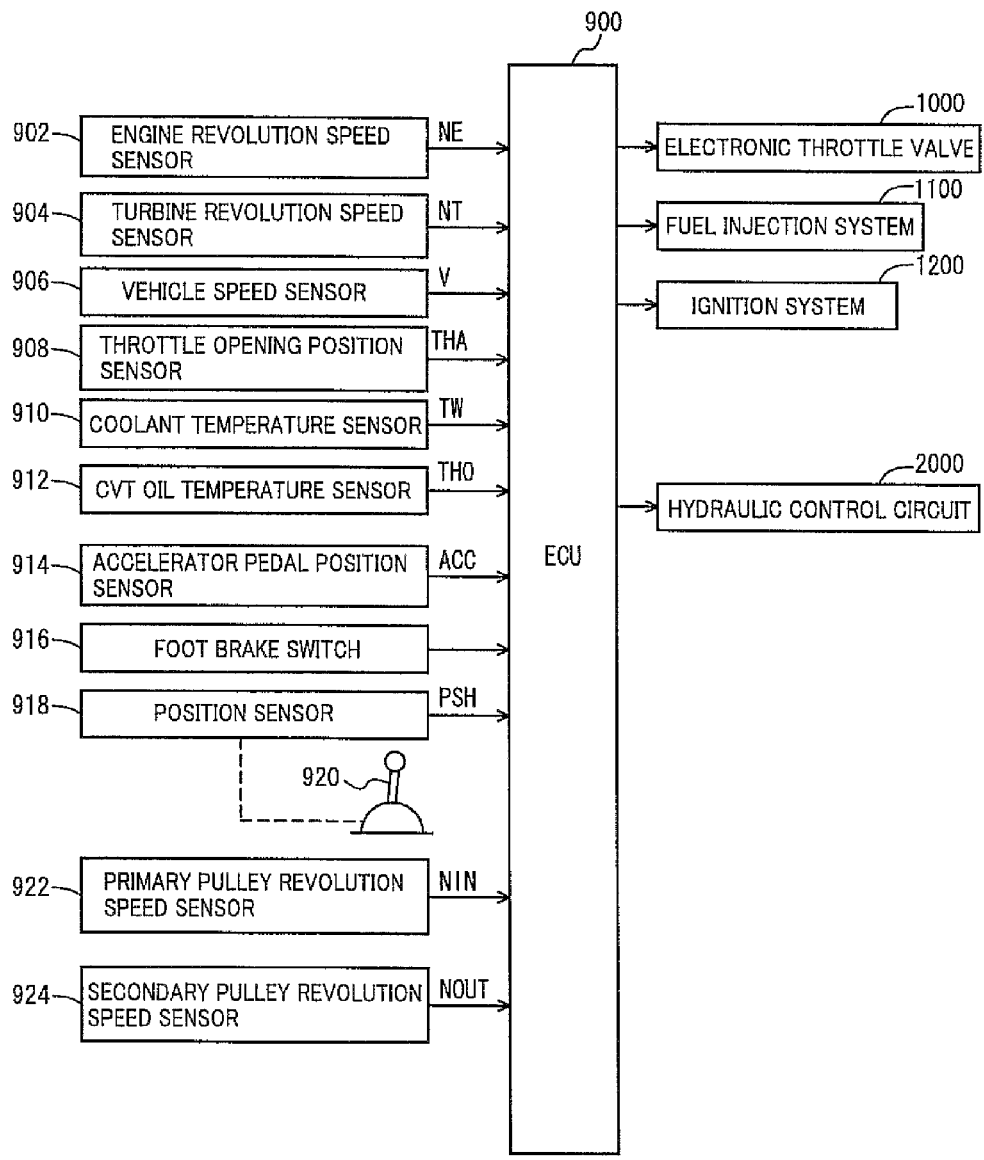
FIG. 2 is a block diagram of a control system of the vehicle.

As shown in FIG. 2, ECU 900 receives a signal from each of an engine revolution speed sensor 902, a turbine revolution speed sensor 904, a vehicle speed sensor 906, a throttle opening position sensor 908, a coolant temperature sensor 910, an oil temperature sensor 912, an accelerator pedal position sensor 914, a foot brake switch 916, a position sensor 918, a primary pulley revolution speed sensor 922, and a secondary pulley revolution speed sensor 924.

Engine revolution speed sensor 902 detects a revolution speed (engine revolution speed) NE of engine 200. Turbine revolution speed sensor 904 detects a revolution speed (turbine revolution speed) NT of turbine shaft 304. Vehicle speed sensor 906 detects a vehicle speed V. Throttle opening position sensor 908 detects an opening position THA of the electronic throttle valve. Coolant temperature sensor 910 detects a coolant temperature TW of engine 200. Oil temperature sensor 912 detects a temperature of the ATF (hereinafter also referred to as an oil temperature) THO that is used for actuating continuously variable transmission 500. Accelerator pedal position sensor 914 detects an accelerator pedal position ACC. Foot brake switch 916 detects whether the foot brake is operated or not. Position sensor 918 detects a position PSH of a shift lever 920 by determining whether the contact point provided in the position corresponding to the shift position is ON or OFF. Primary pulley revolution speed sensor 922 detects a revolution speed (input shaft revolution speed) NIN of primary pulley 504. Secondary pulley revolution speed sensor 924 detects a revolution speed (output shaft revolution speed) NOUT of secondary pulley 508. The signal showing the detection result of each sensor is transmitted to ECU 900. During forward running in which forward clutch 406 is engaged, turbine revolution speed NT is equal to primary pulley revolution speed NIN. Vehicle speed V attains a value corresponding to secondary pulley revolution speed NOUT. Consequently, in the state where the vehicle is at a standstill and forward clutch 406 is engaged, turbine revolution speed NT becomes 0.

ECU 900 includes a CPU (Central Processing Unit), a memory, an input/output interface, and the like. The CPU performs signal processing in accordance with the program stored in the memory, thereby performing output power control of engine 200, shift control of continuously variable transmission 500, control of the belt holding pressure, engagement/disengagement control of forward clutch 406, engagement/disengagement control of reverse brake 410, and the like.

The output power of engine 200 is controlled by an electronic throttle valve 1000, a fuel injection system 1100, an ignition system 1200, and the like. A hydraulic control circuit 2000 performs shift control of continuously variable transmission 500, control of the belt holding pressure, engagement/disengagement control of forward clutch 406, and engagement/disengagement control of reverse brake 410.

Figure 3:
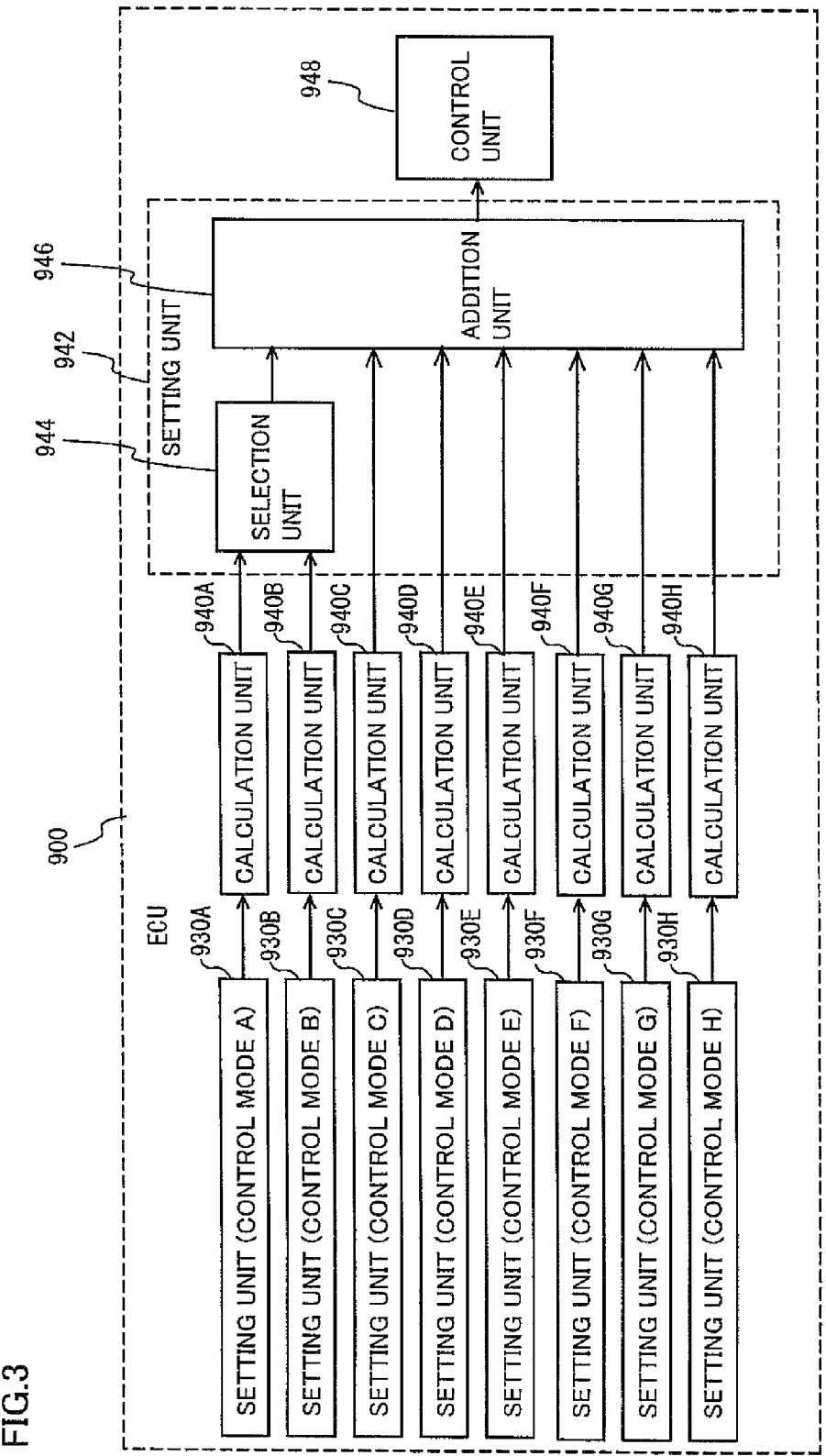
FIG. 3 is a functional block diagram of an ECU in the first embodiment.

The holding pressure for metal belt 510 is set as one of the parameters representing the state of continuously variable transmission 500. The holding pressure is set for each of a plurality of control modes A to H, as shown in FIG. 3. The holding pressure is adjusted in accordance with the driving state of the vehicle so as to prevent metal belt 510 from slipping.

For example, in control mode A, the holding pressure is increased or decreased in accordance with the braking force. During deceleration in the state where the brake pedal is depressed, the hydraulic pressure supplied to secondary pulley 508 is increased as compared with the case where the brake pedal is not depressed. Consequently, metal belt 510 can be prevented from slipping during braking.

In control mode B, the greater the input torque of continuously variable transmission 500 is, the more the holding pressure for metal belt 510, that is, the hydraulic pressure supplied to secondary pulley 508, is increased.

The above-described control modes are merely by way of example. As for the method of setting the holding pressure in each control mode, a well-known and commonly used technique only needs to be applied, and therefore, no further detailed description will be repeated. The number of the control modes is not limited. The type of the control mode is optionally determined by the developer. Each control mode may be configured by software, by hardware, or by a combination of software and hardware.

In the present embodiment, control modes A to H are not alternatively executed but can be simultaneously executed. In other words, the holding pressure may be set in the same time period in a plurality of control modes.

The holding pressure set in each control mode will be hereinafter referred to as the first setting value. The first setting value is set by each of setting units 930A to 930H in ECU 900 for each of a plurality of control modes A to H. In short, the first setting value indicates a target value of the holding pressure for metal belt 510 in the stable state. The holding pressure for metal belt 510 is controlled so as to be eventually equal to the first setting value.

On the other hand, when the target value changes in a stepwise manner, the actual holding pressure may undershoot or overshoot. Thus, the process of limiting the change rate of the target value is performed in order to prevent undershoot or overshoot.

Figure 4:
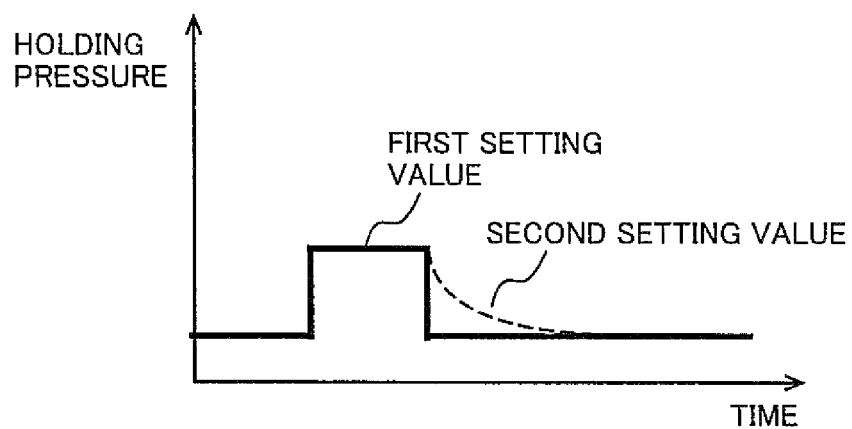
FIG. 4 is a diagram showing the first setting value and the second setting value that are set in a control mode A.

As shown in FIG. 3, ECU 900 includes a plurality of calculation units 940A to 940H provided for their respective plurality of control modes A to H. Based on the first setting value set in each control mode, calculation units 940A to 940H each calculate the second setting value changing in an uncontemporaneous manner or subsequent (i.e. lagging behind the first setting value for each control mode. In the present embodiment, as shown in FIG. 4, the second setting value that decreases lagging behind the first setting value is calculated. In other words, only when the first setting value decreases, the second setting value changes lagging behind the first setting value. Therefore, when the first setting value increases or remains constant, the first setting value and the second setting value are the same. When the first setting value decreases, the second setting value decreases lagging behind the first setting value. The second setting value may be calculated so as to increase lagging behind the first setting value.

The condition for calculating the second setting value, that is, a specific method for calculating the second setting value, is determined in advance by the developer for each control mode. Therefore, the rate of decrease in the second setting value is determined for each control mode.

Figure 5:
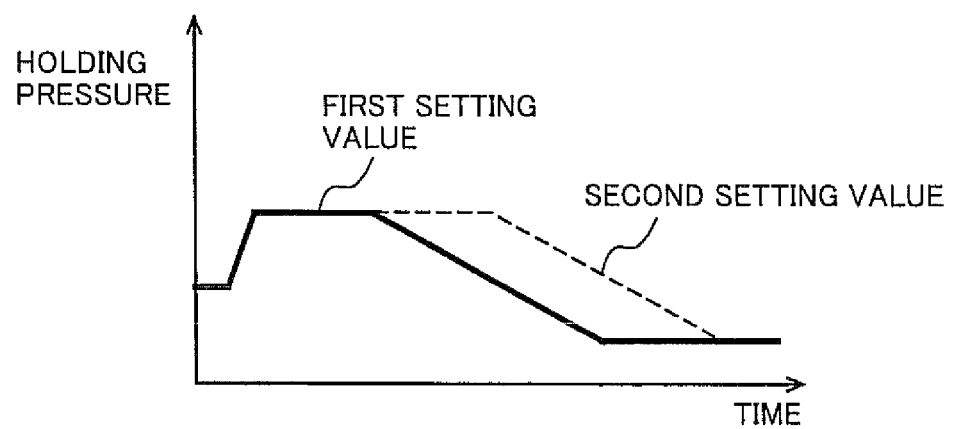
FIG. 5 is a diagram showing the first setting value and the second setting value that are set in a control mode B.

For example, as shown in FIG. 4, the second setting value calculated in control mode A is started to decrease simultaneously or approximately simultaneously with the decrease of the first setting value. Furthermore, the second setting value is calculated such that the decrease rate is gradually lowered. As shown in FIG. 5, the second setting value calculated in control mode B is started to decrease lagging behind the first setting value. On the other hand, the rate of decrease in the second setting value is the same or approximately the same as that in the first setting value. The above-described second setting value is merely by way of example. The method of calculating the second setting value is not limited thereto. The second setting value may be calculated as the first-order lag response to the first setting value.

Calculation units 940A to 940H may be configured by software, by hardware, or by a combination of software and hardware.

Referring back to FIG. 3, the target value eventually used for controlling the holding pressure is set in consideration of a plurality of second setting values. A setting unit 942 in ECU 900 sets the target value of the holding pressure for metal belt 510 so as to be equal to or more than the greatest second setting value among the plurality of second setting values.

For example, the target value is set to be equal to the sum of the plurality of second setting values. More specifically, the target value is set to be equal to the sum of the greatest second setting value among some second setting values and other second setting values. In the present embodiment, by way of example, a selection unit 944 selects the greater second setting value of the second setting value in control mode A and the second setting value in control mode B. In an addition unit 946, the sum of the selected second setting value and the second setting values in other control modes C to H is calculated as a target value.

Figure 6:
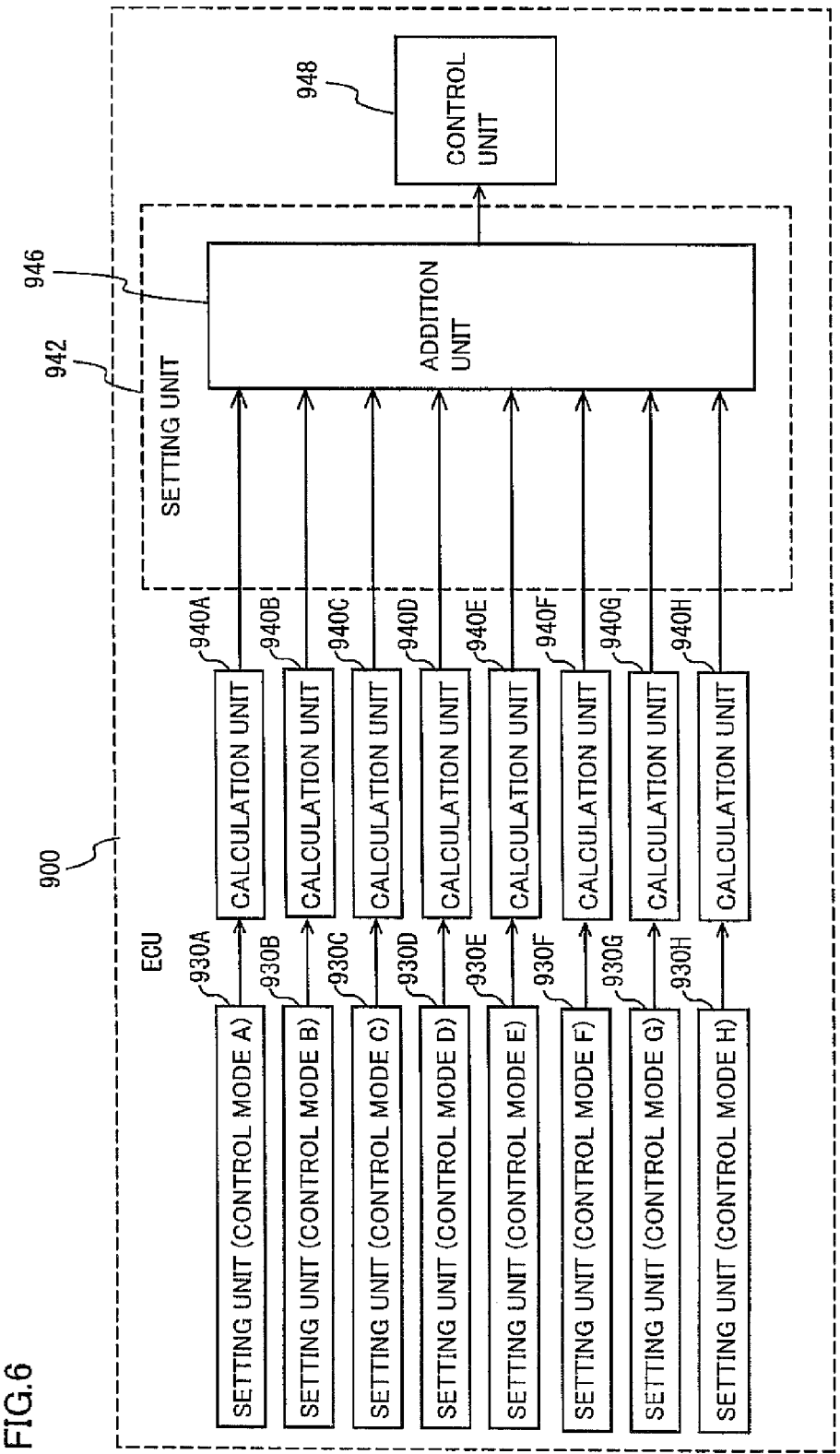
FIG. 6 is a functional block diagram (first) showing a modification of the ECU in the first embodiment.
Figure 7:
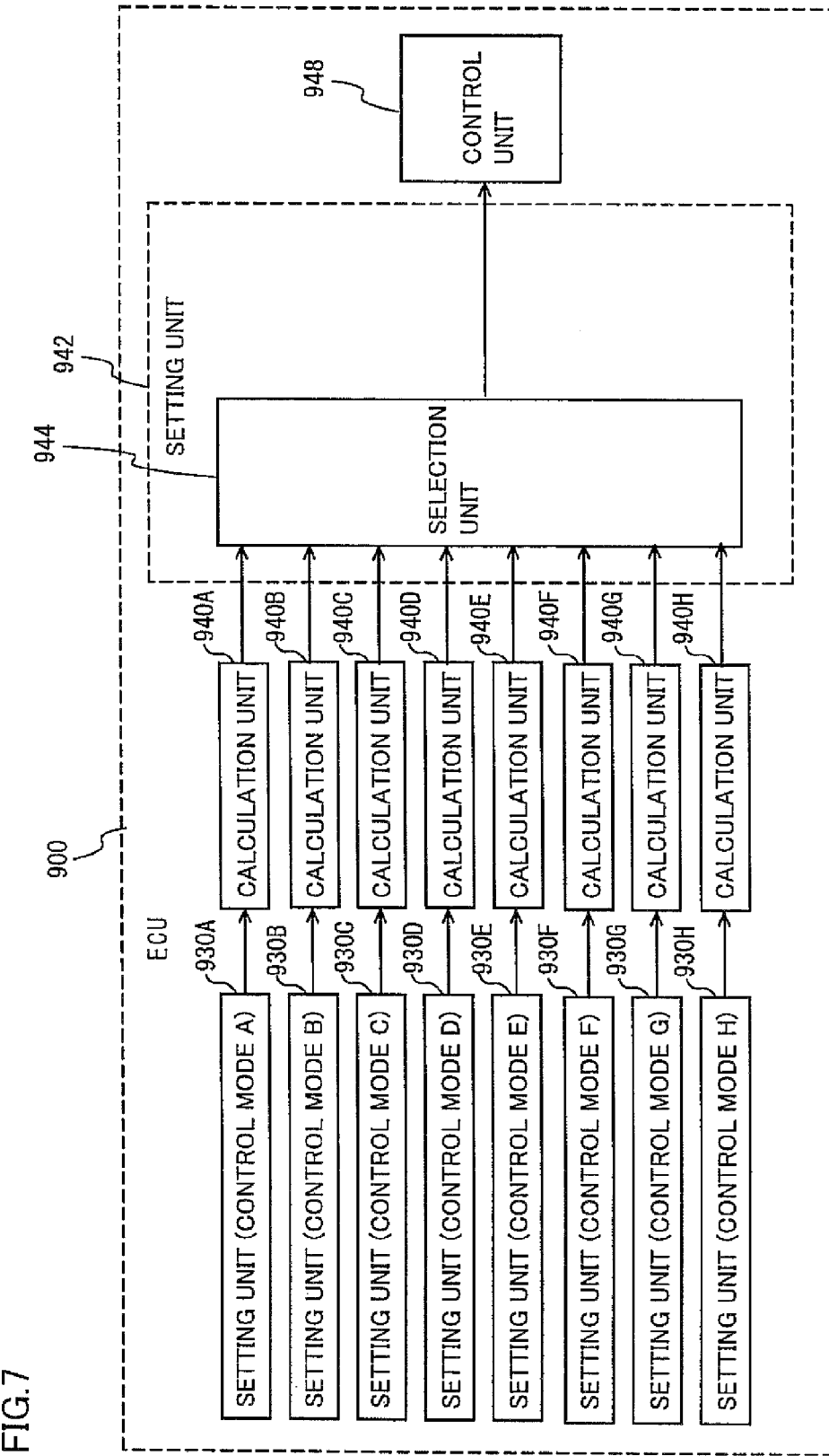
FIG. 7 is a functional block diagram (second) showing a modification of the ECU in the first embodiment.

The method of setting the target value is not limited thereto. The greatest second setting value may be selected from the second setting values in three or more optional control modes. As shown in FIG. 6, the target value may be set to be equal to the sum of the plurality of second setting values without selecting the greatest second setting value among some second setting values. As shown in FIG. 7, the target value may be set to be equal to the greatest second setting value among the plurality of second setting values.

Setting unit 942, selection unit 944 and addition unit 946 may be configured by software, by hardware, or by a combination of software and hardware.

Referring back to FIG. 3, a control unit 948 of ECU 900 controls continuously variable transmission 500 such that the holding pressure for metal belt 510 is equal to the set target value. Control unit 948 may be configured by software, by hardware or by a combination of software and hardware.

Figure 8:
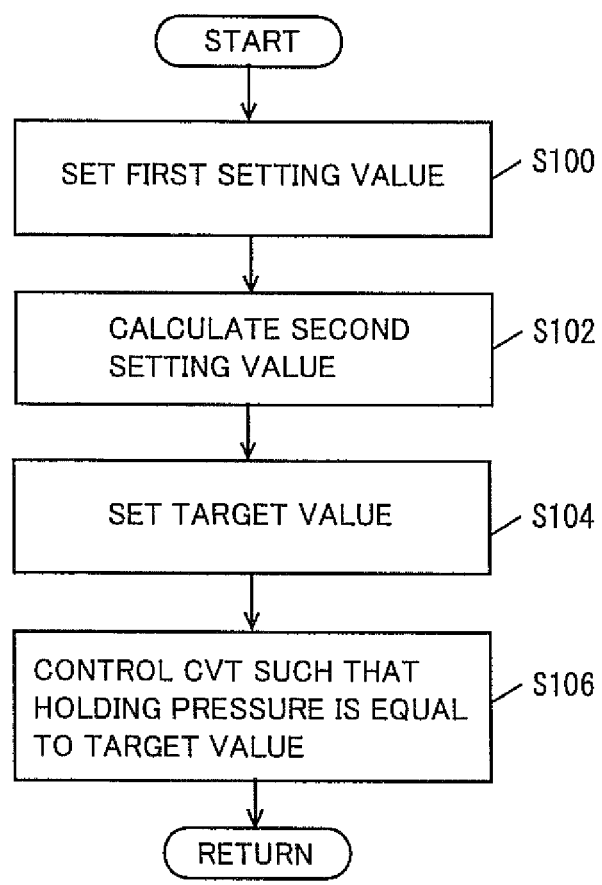
FIG. 8 is a flowchart of the process performed by the ECU in the first embodiment.

Referring to FIG. 8, the process executed by ECU 900 will then be described.

In step (which will be hereinafter abbreviated as S) 100, ECU 900 sets the first setting value of the holding pressure for metal belt 510 for each of the plurality of control modes.

In S102, based on the first setting value, ECU 900 calculates the second setting value that changes lagging behind the first setting value for each of the plurality of control modes.

In S104, ECU 900 sets the target value of the holding pressure to be equal to or more than the greatest second setting value among the plurality of second setting values.

In S106, ECU 900 controls continuously variable transmission 500 such that the holding pressure for metal belt 510 is equal to the target value.

In this way, the target value can be set in consideration of the condition determined for each of the plurality of control modes. Accordingly, based on a plurality of conditions determined in the plurality of control modes, the holding pressure for metal belt 510 can be controlled.

Figure 9:
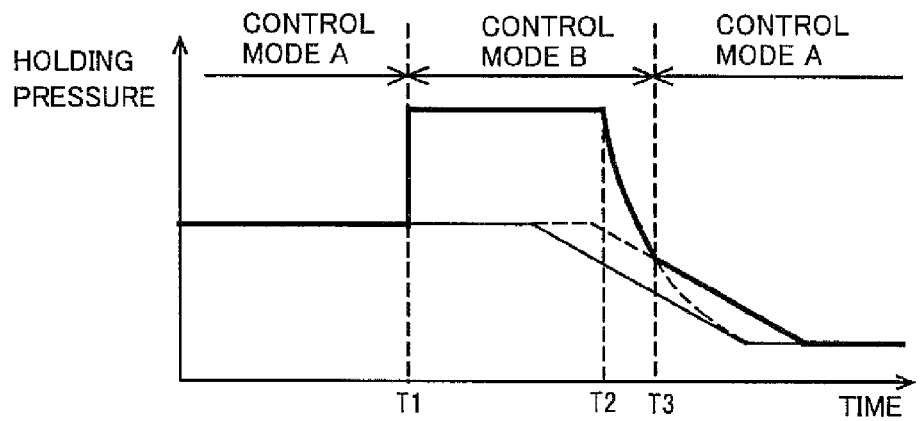
FIG. 9 is a diagram showing a target value set in consideration of the second setting value determined for each of a plurality of control modes.

For example, as shown in FIG. 9, it is assumed that the input torque of continuously variable transmission 500 is decreased during the time period from time T1 at which the brake pedal is depressed to time T2 at which the brake pedal is released.

In this case, while the brake pedal is being depressed, the holding pressure for metal belt 510 is increased to the pressure determined in consideration of high braking force. After the brake pedal is released, the holding pressure is gradually decreased at the rate determined in control mode B until the second setting value in control mode B becomes equal to the second setting value in control mode A at time T3.

Then, the holding pressure is gradually lowered at the rate determined in control mode A to the pressure determined in consideration of the input torque lower than the input torque obtained before the brake pedal is depressed.

Consequently, during the time period while the holding pressure for metal belt 510 is changing, continuously variable transmission 500 can be controlled so as to satisfy the conditions required for each of the plurality of control modes. Therefore, the holding pressure can be suitably controlled.

In addition, the parameter representing the state of continuously variable transmission 500 is not limited to the holding pressure for metal belt 510. The present invention may be applied to the input shaft revolution speed of continuously variable transmission 500, the gear ratio, the engine revolution speed, the output torque of engine 200, and the like.

Second Embodiment

Figure 10:
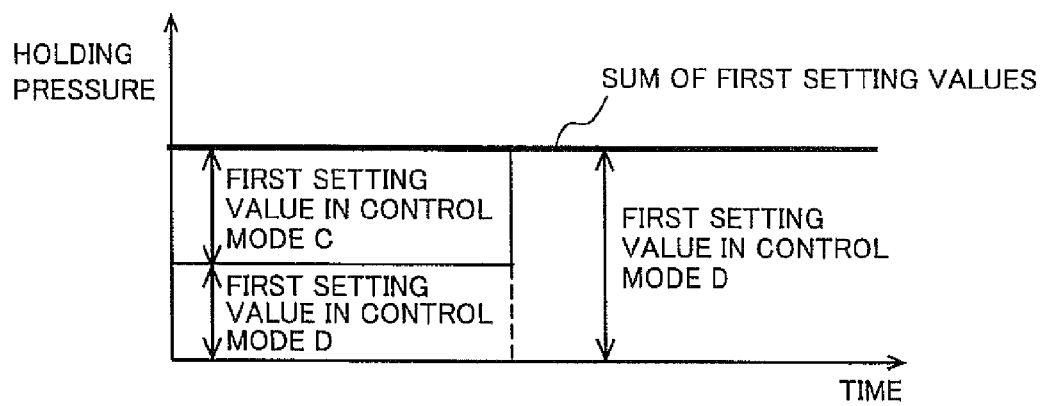
FIG. 10 is a diagram showing the sum of the first setting values determined for their respective plurality of control modes.

The second embodiment will be hereinafter described. As described above, in the first embodiment, in order to prevent undershoot of the actual holding pressure, the second setting value changing lagging behind the first setting value is calculated based on the first setting value set for each of the plurality of control modes. On the other hand, as shown in FIG. 10, the actual holding pressure may not show undershoot and the like to the target value during the time period while the sum of the first setting values remains constant. Therefore, it is not necessary to perform the process for smoothly connecting the first setting values before and after decrease, that is, not necessary to calculate the second setting value. Thus, the second setting value is nullified in the present embodiment. Nullification of the second setting value is achieved by limiting the target value to be equal to or less than the sum of the plurality of first setting values during the time period while the sum of the plurality of first setting values set in the plurality of control modes remains constant.

Figure 11:
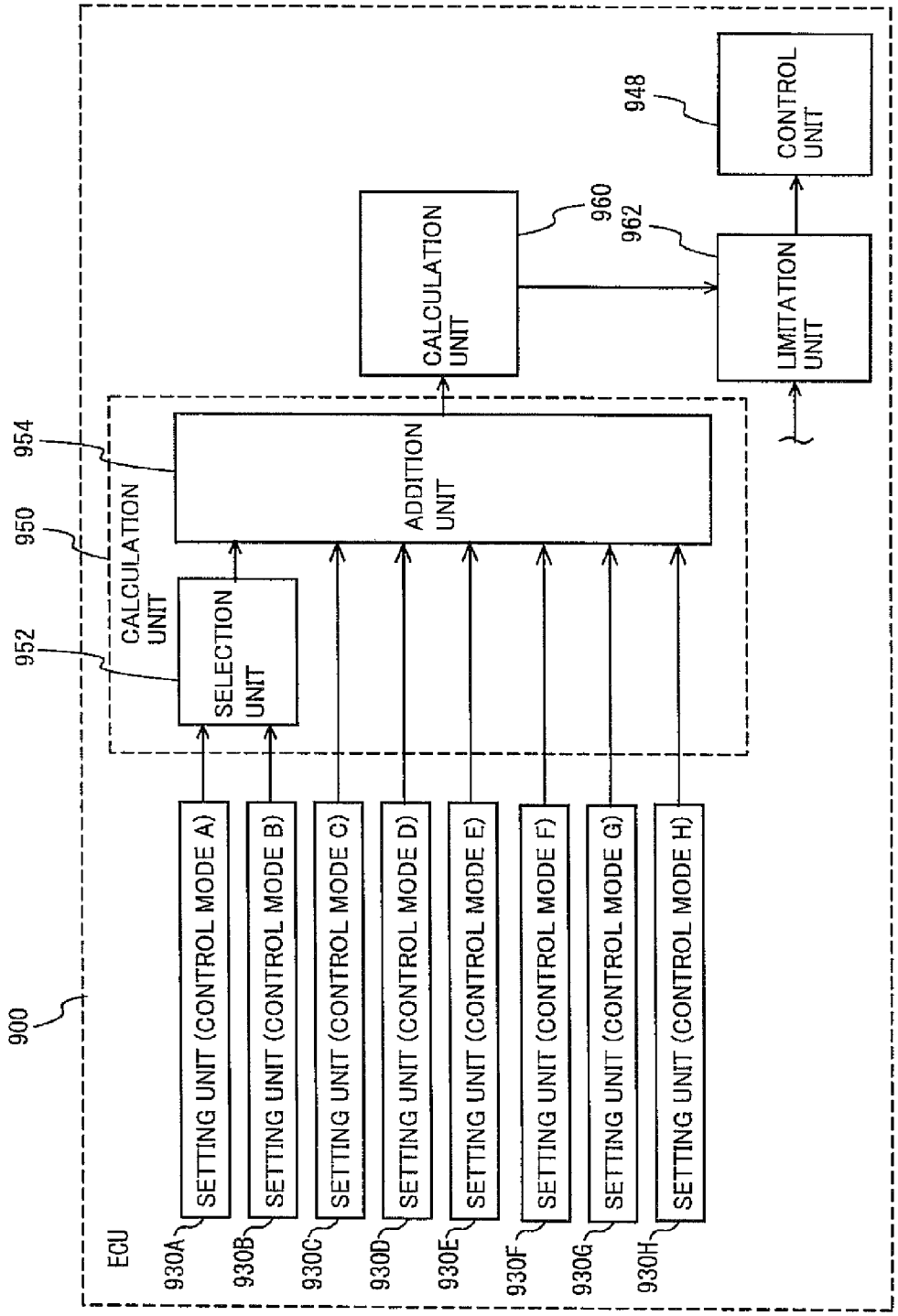
FIG. 11 is a functional block diagram (first) of the ECU in the second embodiment.
Figure 12:
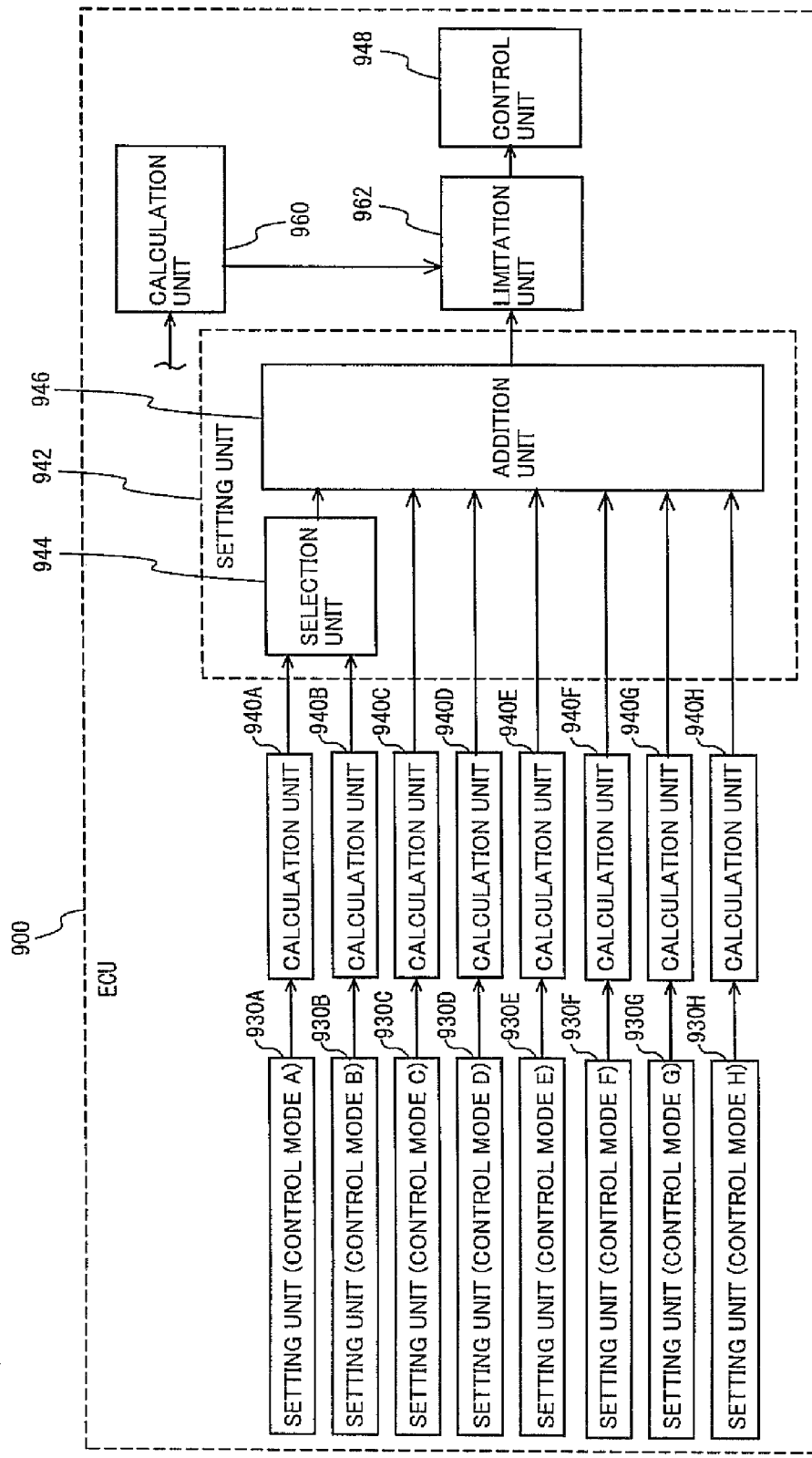
FIG. 12 is a functional block diagram (second) of the ECU in the second embodiment.

Referring to FIGS. 11 and 12, the function of ECU 900 will be hereinafter described. It is to be noted that the same functions as those in the above-described first embodiment are designated by the same reference characters, and therefore, detailed description thereof will not be repeated.

A calculation unit 950 in ECU 900 calculates the sum of the plurality of first setting values calculated in their respective plurality of control modes. For example, the sum of the greatest first setting value among some first setting values and other first setting values is calculated. In the present embodiment, by way of example, a selection unit 952 selects the greater first setting value of the first setting value in control mode A and the first setting value in control mode B. In an addition unit 954, the sum of the selected first setting value and the first setting values in other control modes C to H is calculated.

The greatest first setting value may be selected from the first setting values in three or more optional control modes. The sum of the plurality of second setting values may be calculated without selecting the greatest first setting value.

Calculation unit 950, selection unit 952 and addition unit 954 may be configured by software, by hardware, or by a combination of software and hardware.

Figure 13:
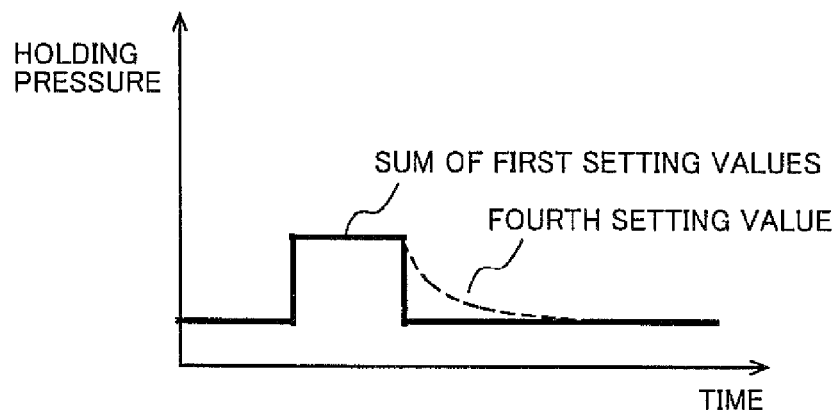
FIG. 13 is a diagram showing an example of the fourth setting value.

Based on the sum of the plurality of first setting values, calculation unit 960 in ECU 900 calculates the fourth setting value that changes lagging behind the sum of the plurality of first setting values. For example, a supplemental or fourth setting value is calculated in the same manner as that in the case of the second setting value showing the slowest change rate among the second setting values calculated in their respective plurality of control modes A to H. Therefore, if the change rate of the second setting value calculated in control mode A is the slowest, as shown in FIG. 13, the fourth setting value is calculated so as to decrease at the rate similar to that of the second setting value calculated in control mode A.

Referring back to FIGS. 11 and 12, a limitation unit 962 in ECU 900 limits the target value to be equal to or less than the fourth setting value. Specifically, the smaller one of the sum of the plurality of second setting values (the sum of the greatest second setting value among some second setting values and other second setting values) and the fourth setting value is output as a target value.

As described above, the fourth setting value is calculated so as to decrease lagging behind the sum of the plurality of first setting values. In other words, only when the sum of the plurality of first setting values decreases, the fourth setting value changes lagging behind the sum of the plurality of first setting values. Therefore, the fourth setting value remain the same as the sum of the plurality of first setting values during the time period while the sum of the plurality of first setting values set in the plurality of control modes remains constant.

Figure 14:
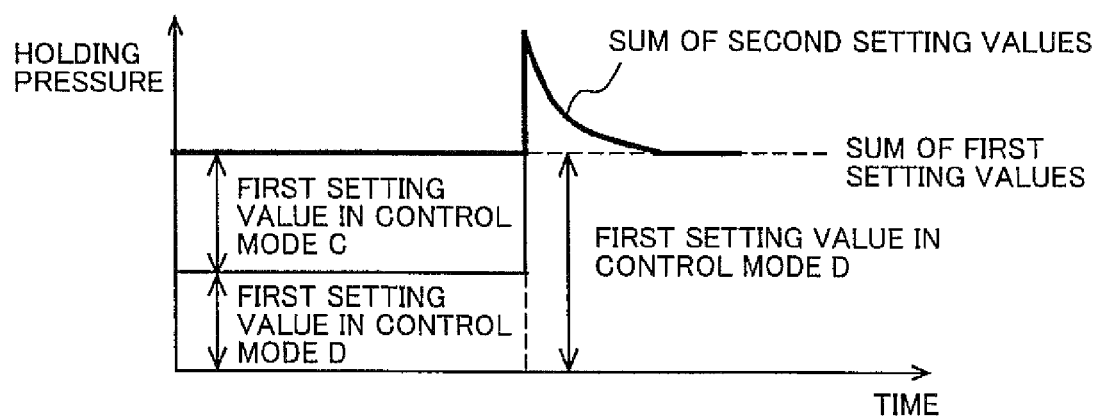
FIG. 14 is a diagram showing an example of the holding pressure without limitation.

On the other hand, as shown in FIG. 14, for example, when the first setting value set in control mode C decreases, the second setting value is calculated so as to decrease lagging behind the first setting value. Accordingly, when the first setting value set in control mode D increases by the amount of decrease in the first setting value set in control mode C, the sum of the second setting values is greater than the sum of the first setting values even if the sum of the first setting values remains constant.

Therefore, by providing an output of the smaller one of the sum of the plurality of second setting values and the fourth setting value as a target value, the target value is limited to be equal to or less than the sum of the plurality of first setting values during the time period while the sum of the plurality of first setting values set in the plurality of control modes remains constant.

Figure 15:
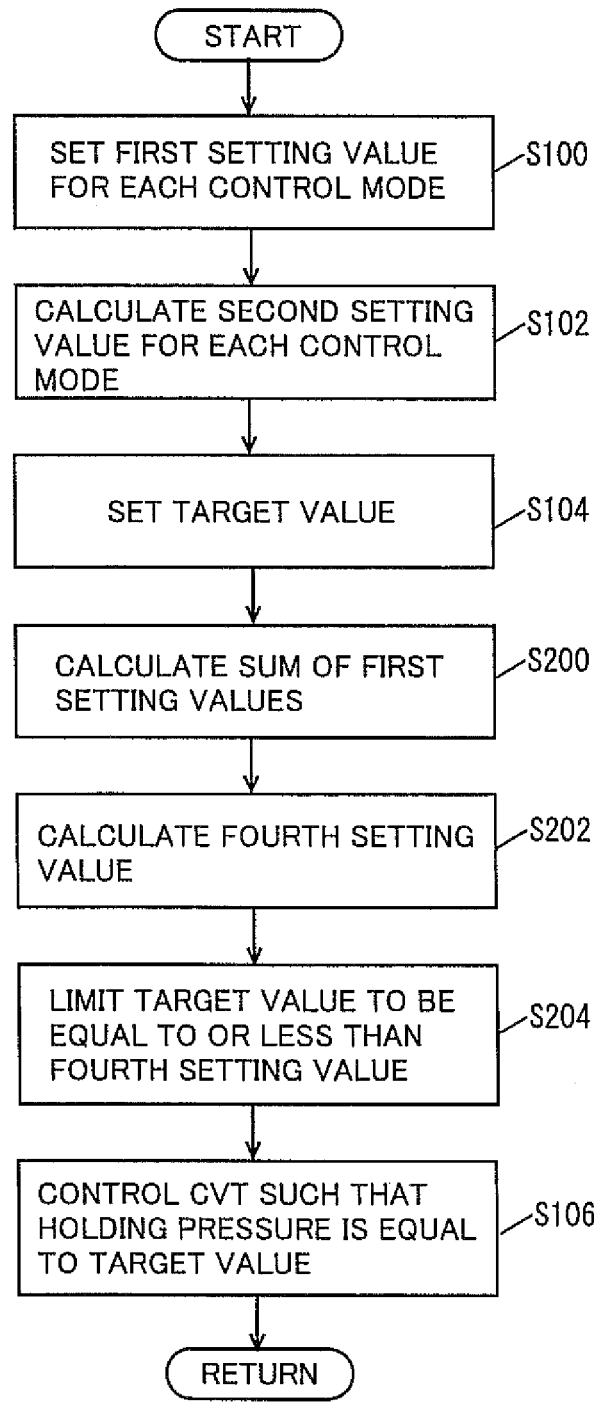
FIG. 15 is a flowchart showing the process performed by the ECU in the second embodiment.
Figure 16:
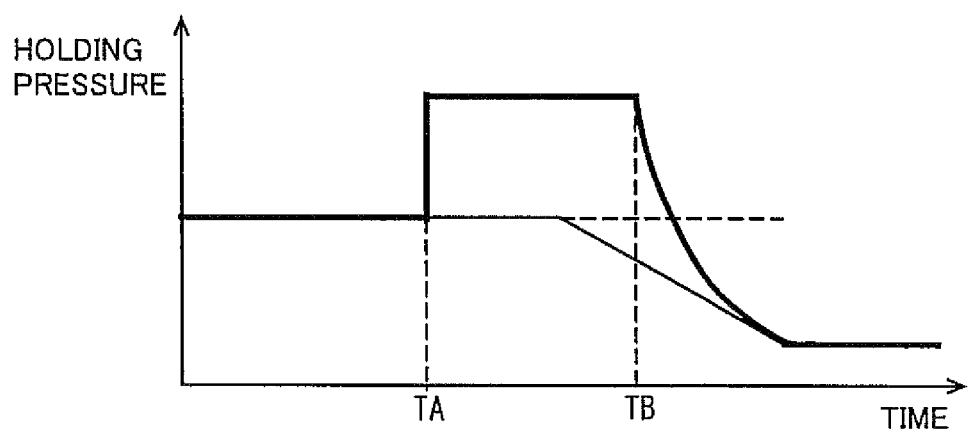
FIG. 16 is a diagram showing an example of the holding pressure for a metal belt in the case where the invention of the present application is not applied.

Referring to FIG. 15, the control structure of the program executed by ECU 900 will be hereinafter described. It is to be noted that the same process as that in the above-described first embodiment will be designated by the same step number. Therefore, detailed description thereof will not be hereinafter repeated.

In S200, ECU 900 calculates the sum of the plurality of first setting values. More specifically, the sum of the greatest first setting value among some first setting values and other first setting values is calculated.

In S202, ECU 900 calculates the fourth setting value that changes lagging behind the sum of the plurality of first setting values.

In S204, ECU 900 limits the target value to be equal to or less than the fourth setting value.

In this way, a wasteful increase in the holding pressure can be prevented.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 100 powertrain, 200 engine, 300 torque converter, 500 continuously variable transmission, 502 input shaft, 504 primary pulley, 506 output shaft, 508 secondary pulley, 510 metal belt, 900 ECU, 930 setting unit, 940 calculation unit, 942 setting unit, 944 selection unit, 946 addition unit, 948 control unit, 950 calculation unit, 952 selection unit, 954 addition unit, 960 calculation unit, 962 limitation unit

The invention claimed is:

1. A vehicle comprising:
a continuously variable transmission including a pair of pulleys and one of a belt and a chain transmitting a torque between said pair of pulleys; and
an electronic control unit programmed to control said continuously variable transmission, wherein
said electronic control unit:
sets a first value of a pressure given by said pulleys for holding one of said belt and said chain for each of a plurality of control modes,
calculates a second value that is a pressure given by said pulleys for holding one of said belt and said chain for each of a plurality of control modes, said second value changes subsequent to said first value and changes based on said first value for each of said plurality of control modes,
sets a target value of a pressure given by said pulleys for holding one of said belt and said chain to be equal to or more than a greatest second value among a plurality of said second values,
sets said first value as an upper limit value when performing one control mode,
sets a sum of a plurality of said first values as a upper limit value when performing said plurality of control modes,
limits said target value to be equal to or less than said upper limit value while said upper limit value remains constant, and
controls said continuously variable transmission such that a pressure given by said pulleys for holding one of said belt and said chain is equal to said target value.

2. The vehicle according to claim 1, wherein said second value is calculated so as to decrease subsequent to said first value.

3. The vehicle according to claim 1, wherein
said electronic control unit:
calculates a supplementary value that changes subsequent to a sum of a plurality of said first values and changes based on the sum of the plurality of said first values, and
limits said target value to be equal to or less than said supplementary value.

4. The vehicle according to claim 1, wherein said electronic control unit sets said target value to be equal to a sum of the plurality of said second values.

5. The vehicle according to claim 1, wherein said electronic control unit sets the target value to be equal to a sum of the plurality of second values.

6. The vehicle according to claim 1, wherein said electronic control unit sets said target value to be equal to the greatest second value among the plurality of said second values.

7. A control method for a continuously variable transmission including a pair of pulleys and one of a belt and a chain transmitting a torque between said pair of pulleys, the continuously variable transmission controlled by an electronic control unit, comprising the steps of:
setting, by the electronic control unit, a first value of a pressure given by said pulleys for holding one of said belt and said chain for each of a plurality of control modes;
calculating, by the electronic control unit, a second value as a pressure given by said pulleys for holding one of said belt and said chain for each of a plurality of control modes, said second value changes subsequent to said first value and changes based on said first value for each of said plurality of control modes;

setting, by the electronic control unit, a target value of a pressure given by said pulleys for holding one of said belt and said chain to be equal to or more than a greatest second value among a plurality of said second values;

setting, by the electronic control unit, said first value as an upper limit value when performing one control mode;

setting, by the electronic control unit, a plurality of said first values as an upper limit value when performing said plurality of control modes;

limiting, by the electronic control unit, said target value to be equal to or less than said upper limit value while said upper limit value remains constant; and controlling, by the electronic control unit, said continuously variable transmission such that a pressure given by said pulleys for holding one of said belt and said chain is equal to said target value.

* * * * *